United States Patent [19]

Stiefel et al.

[11] Patent Number: 4,487,740
[45] Date of Patent: Dec. 11, 1984

[54] PROCEDURE AND EQUIPMENT FOR INJECTING GAS INTO LIQUIDS

[75] Inventors: Max Stiefel, Mannheim; Erich Wolfbeiss, Ettlingen, both of Fed. Rep. of Germany

[73] Assignee: Babcock-Brown Boveri Reaktor GmbH, Mannheim, Fed. Rep. of Germany

[21] Appl. No.: 947,671

[22] Filed: Oct. 2, 1978

[30] Foreign Application Priority Data

Oct. 27, 1977 [DE] Fed. Rep. of Germany ....... 2748159

[51] Int. Cl.³ ............................................. G21C 17/00
[52] U.S. Cl. .................................. 376/256; 376/277; 376/308
[58] Field of Search ..................... 176/38, 92 R, 19 R, 176/87 L, 37, 54, 55, 56; 261/94, DIG. 72; 366/138; 376/256, 277, 308

[56] References Cited

U.S. PATENT DOCUMENTS

| | | | |
|---|---|---|---|
| T955,004 | 2/1977 | Sayre | 176/19 R |
| 2,937,981 | 5/1960 | Allen | 176/38 |
| 3,060,726 | 10/1962 | Weber | 176/86 L |
| 3,113,913 | 12/1963 | Newton | 176/37 |
| 3,286,992 | 11/1966 | Armeniades | 239/402 |
| 3,353,797 | 11/1967 | Simonetti | 366/138 |
| 3,450,388 | 6/1969 | Stump | 366/138 |
| 3,539,509 | 11/1970 | Heitmann | 210/222 |
| 3,575,294 | 4/1971 | Hirowatari | 176/37 |
| 3,663,725 | 5/1972 | Pearl | 176/92 R |
| 3,871,842 | 3/1975 | Queiser | 176/37 |
| 3,964,965 | 6/1976 | Kausz | 176/37 |
| 3,976,541 | 8/1976 | Stiteler | 176/38 |
| 4,039,289 | 8/1977 | Collins | 261/94 |
| 4,043,864 | 8/1977 | Heitmann | 176/37 |
| 4,073,683 | 2/1978 | VanderSchoot | 176/86 L |

OTHER PUBLICATIONS

*Stata-Tube*, 12 pp. of Sales Literature for Stata-Tube, TAH Industries, 1977 and 1978.
S. J. Chen, KTEK-12345678: The Static Mixer Unit and Principles of Operation, (Kenics Corp., 1972).
R. G. Gilbert, et al., Field for Oxygen Transfer and Mixing in Static Mixer Aeration Systems, (Kenics Corp., 1977).
Luwa Blendrex Motionless Mixer, (Luwa Corp., date unknown), [hereinafter "Luwa"].

*Primary Examiner*—Sal Cangialosi
*Attorney, Agent, or Firm*—Mark B. Quatt; D. Anthony Gregory; Robert J. Edwards

[57] ABSTRACT

A method and apparatus is shown for establishing a predetermined concentration of gas in the reactor core coolant for a pressurized water nuclear power system. Gas is added to core coolant water in a bubble column. The gas-water mixture flows through static mixers in the column to produce the desired gas concentration in the water.

5 Claims, 1 Drawing Figure

PROCEDURE AND EQUIPMENT FOR INJECTING GAS INTO LIQUIDS

TECHNICAL FIELD

This invention is directed to a procedure for injecting gas into liquids, and, more particularly to the injection of hydrogen into the primary coolant of pressurized water nuclear power plants.

BACKGROUND ART

For example, it is not uncommon in nuclear power plants, to inject hydrogen gas into primary coolant water by spraying the primary coolant into an hydrogen atmosphere, e.g. into the hydrogen gas blanket of the makeup tank, or by bubbling hydrogen gas in the water phase of the makeup tank. The makeup tank among other things, is used to equalize primary coolant volume changes, and contains both the primary coolant and a hydrogen-gas blanket.

These known procedures have the disadvantage that due to the large hydrogen volume in the makeup tank, a release of relatively large hydrogen volumes into the space surrounding the makeup tanks is possible, and therefore the occurrence of combustible gas explosions must be taken into account. Further, the gas/water concentration can not be precisely controlled.

There is a need, therefore, to find a procedure through which a predetermined gas concentration can be reached in the liquid under consideration and through which the potential release of dangerous volumes of explosive gas can be minimized.

SUMMARY OF THE INVENTION

The problem is solved in that the liquid flows through a bubble column, only the gas volume necessary for reaching the required gas content is injected into the bubble column above the liquid inlet, and the gas and liquid are mixed prior to leaving the bubble column.

The device used for implementing this procedure has a bubble column that contains several motionless mixers. The gas feed line is equipped with a gas pump, and the pipe section of the two-conduit gas injection line arranged inside the bubble column is equipped with nozzles.

The nozzles, moreover, can be flushed with the aid of a bypass flow of the liquid to be gassed. An advantage of this feature is that the bypass flow conduits are connected with the pipe sections that support the nozzles.

A ventilation line is also attached at the bubble column in order to prevent gas bubble formation in the primary coolant. Analyses measuring devices are installed in the liquid line upstream and downstream of the bubble column.

The gas volume injected through the gas pump depends upon the pre-existing hydrogen concentration of the liquid to be injected with gas, and the head of the liquid flow.

In accordance with a specific embodiment of the invention, the isolation valves of the bypass flow conduits can be manipulated to enable the nozzles to be covered with gas and rinse water on alternate sides.

BRIEF DESCRIPTION OF THE DRAWING

The method and apparatus for implementing the invention are shown in a schematic drawing.

DESCRIPTION OF THE PREFERRED EMBODIMENTS

Figure 1:
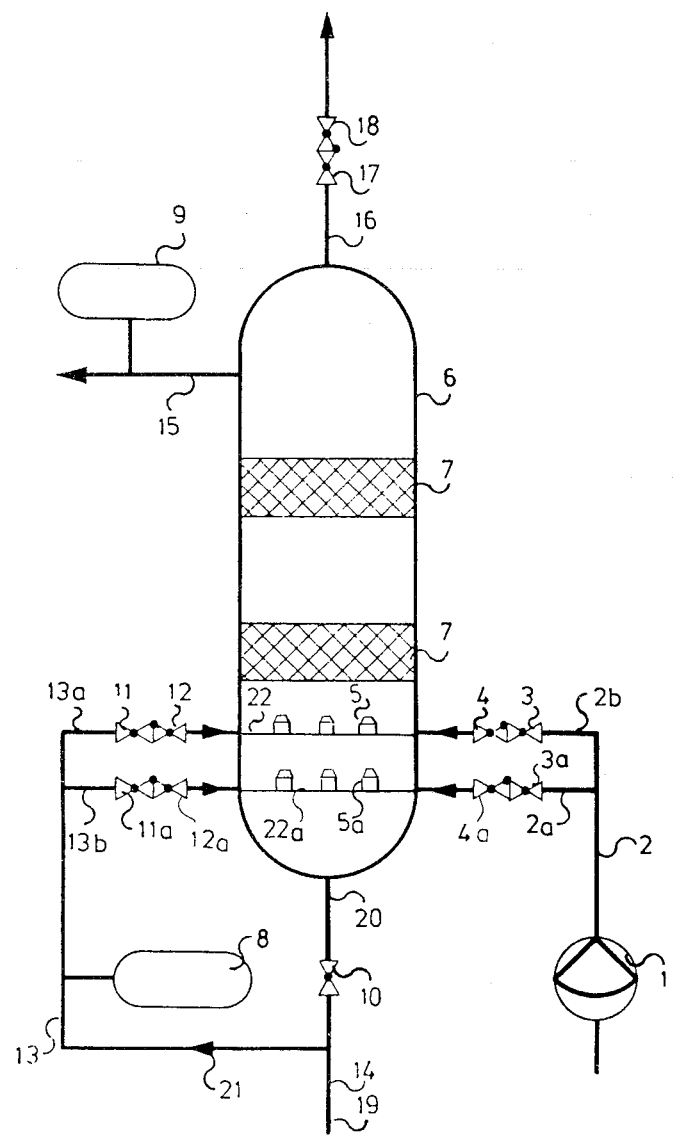

In conduit 14 the primary coolant to be injected with gas flows into a pressurized water reactor system (not shown) in the direction of arrow 19, and after the adjustment of the volume flow control valve 10, flows into bubble column 6 at liquid inlet 20. With the aid of gas proportioning or dosage equipment, e.g. gas dosage pump 1, the hydrogen gas in conduit 2 is channeled into the bubble column 6 and is injected above liquid inlet 20 via the double gas injection conduits 2a or 2b, and nozzles 5 or 5a.

Hydrogen gas and primary coolant are now intensively mixed when liquid flows through motionless mixer 7. After the liquid has flowed through the mixer 7, the primary coolant which has been provided with the desired hydrogen content, discharges from the bubble column 6 through conduit 15. Automatic ventilation through the conduit 16, float valve 17 and isolation valve 18 ensures that no gas bubbles remain in the primary coolant. Bypass conduit 13 in which coolant flows in the direction of arrow 21, which comprises a certain portion of the primary coolant that to be injected with gas flows, branches off from the conduit 14.

The mode of operation for implementing the flushing process enables the nozzles 5, 5a to be flushed alternately, or to be used for gas injection. For the case "flush nozzle 5", isolation valves 3 and 11a are closed and isolation valves 11 and 3a are open. For the case "flush nozzle 5a" isolation valves 3a and 11 are closed and isolation valves 11a and 3 are open. Check valves 4a, 12a, 4 and 12 prevent gas or flushing liquid from returning.

An analysis measuring device 8 is installed in bypass conduit 13, which measures the hydrogen gas concentration of the liquid to be injected with gas so that exact gas dosing can be accomplished through the gas dosage pump 1 as a function of gas content and liquid volume in conduit 14.

It should also be noted that the entire gassing and flushing process takes place automatically.

Gassing in accordance with the principles of the invention now is possible in a simplified and advantageous manner. Nitrogen, moreover, can be used as a gas blanket for the makeup tank, in order to avoid the danger of a combustible gas explosion.

An additional advantage of the invention is the fact that the hydrogen concentration of the reinjected primary coolant can be kept within a specified range during load change processes.

The embodiments of the invention in which as exclusive property or privilege is claimed are defined as follows:

1. A device for injecting a gas into a stream of reactor coolant for a pressurized water nuclear power plant comprising:
    a bubble column, the stream of reactor coolant being directed up therethrough;
    motionless mixer means positioned within said bubble column for mixing the stream of reactor coolant;
    a gas pump;
    gas conduit means for establishing fluid communication between said gas pump and said bubble column below said motionless mixer means;
    a plurality of nozzles on said gas conduit means establishing fluid communication between said gas conduit means and the stream of reactor coolant within said bubble column;

gas analysis measuring apparatus for measuring the gas concentration in the reactor coolant liquid.

2. A device as in claim 1 further comprising:

by-pass flow conduit means for establishing fluid communication between the coolant prior to entry into said bubble column and said plurality of nozzles to enable a portion of the stream of reactor coolant to bypass a portion of said bubble column and flush a portion of said plurality of nozzles;

valve means for selectively isolating said plurality of nozzles from said gas injection conduit means and said by-pass flow conduit means.

3. A device as in claim 2 wherein:

said plurality of nozzles include a first group of nozzles and a second group of nozzles;

said gas conduit means includes a first gas conduit and a second gas conduit establishing fluid communication between said first group of nozzles and said second group of nozzles respectively;

said by-pass flow conduit means including a first by-pass flow conduit and a second by-pass flow conduit providing fluid communication between the coolant prior to entry into said bubble column and said first group of nozzles and said second group of nozzles respectively;

said valve means being capable of selectively isolating said first group of nozzles and said second group of nozzles from said gas pump while by-pass flow is directed therethrough, while said second group of nozzles and said first group of nozzles respectively remain in fluid communication with said gas pump to provide flushing without interrupting the gas injection.

4. A device according to claim 1 further comprising:

a vent conduit to eliminate gas bubbles from the reactor coolant liquid in said bubble column above said motionless mixer means; and, vent valve means for isolating said vent conduit and precluding backflow through said vent conduit into said bubble column.

5. A method for injecting gas into a reactor coolant for a pressurized water nuclear power plants comprising the steps of passing the coolant up through a bubble column that has a liquid inlet, injecting only the gas quantity needed for reaching a predetermined gas concentration in the coolant into the bubble column above the liquid inlet and mixing the gas and the coolant prior to leaving the bubble column.

* * * * *